Sept. 11, 1956     E. C. ZIMMERMAN     2,762,570
TRUCK CARGO HEATER AND CONTROL THEREFOR
Filed Oct. 25, 1952     2 Sheets-Sheet 1
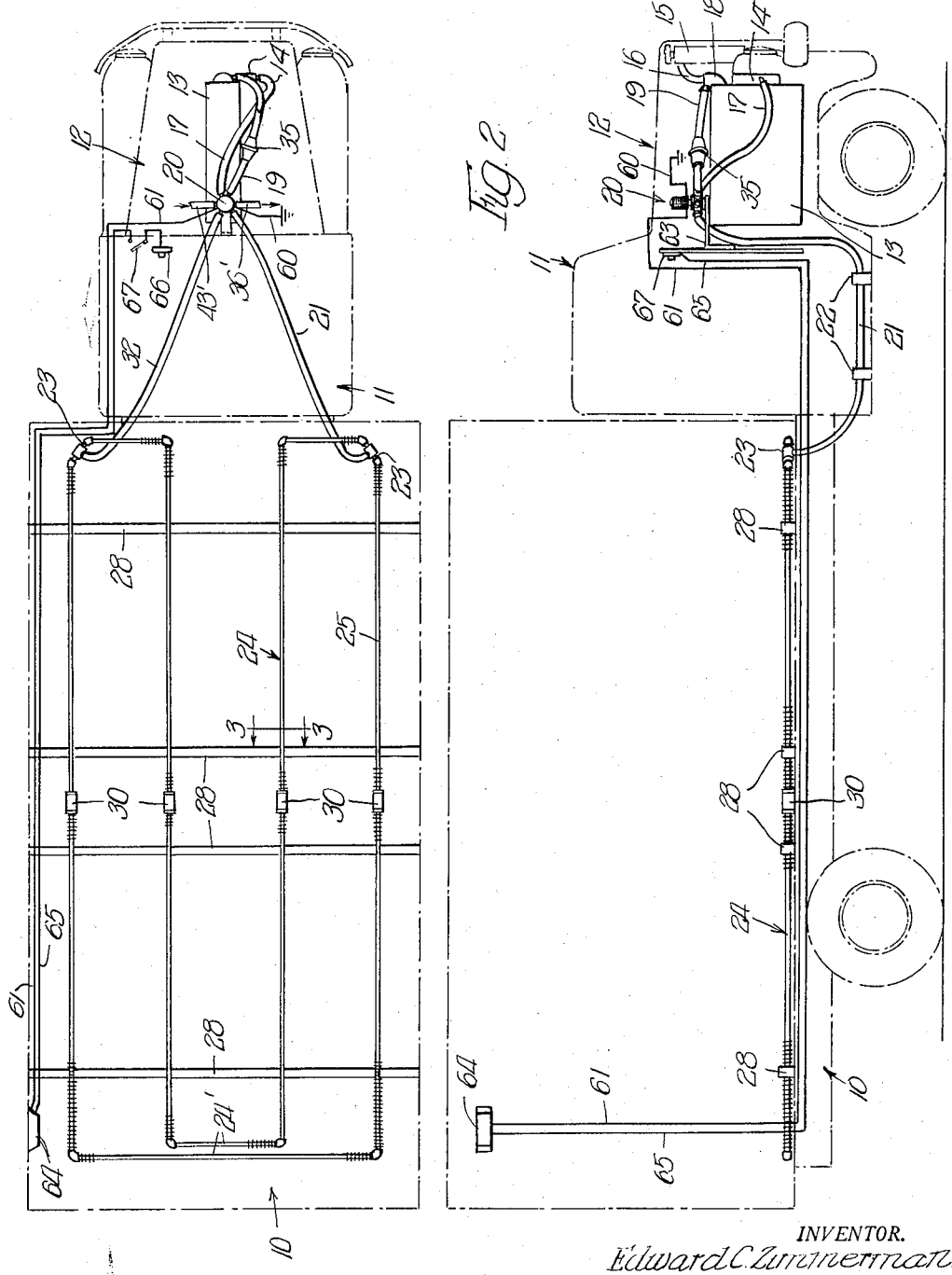
INVENTOR.
Edward C. Zimmerman,
BY
Cromwell, Greist & Warden
Attys

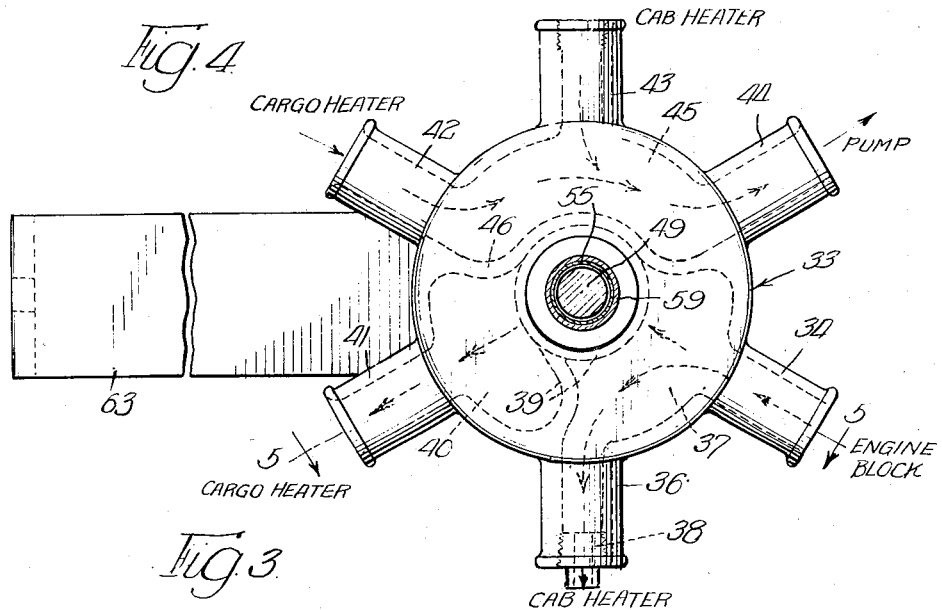
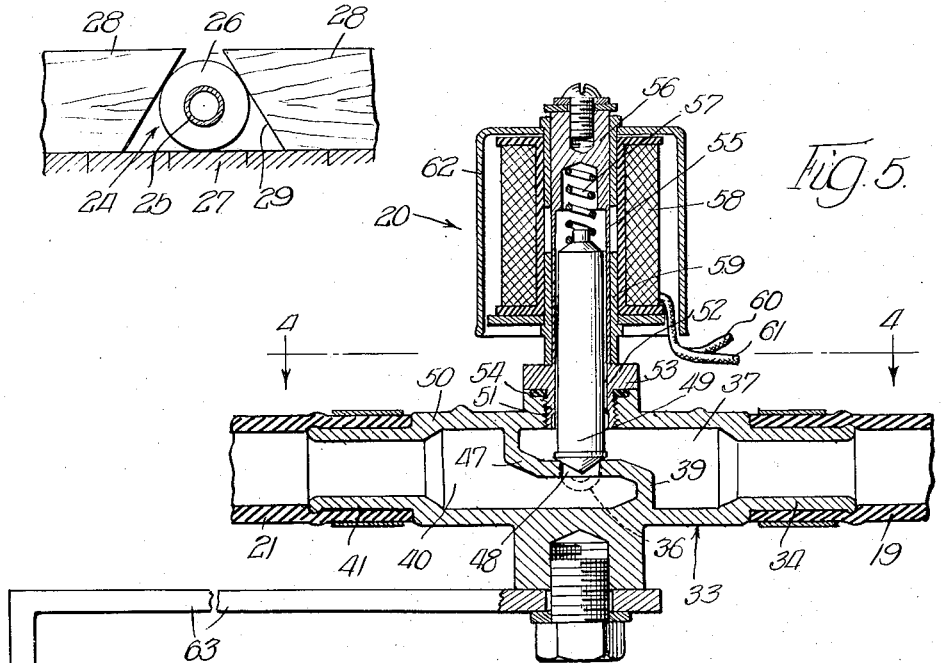

United States Patent Office 2,762,570
Patented Sept. 11, 1956

2,762,570

TRUCK CARGO HEATER AND CONTROL THEREFOR

Edward C. Zimmerman, Winnetka, Ill., assignor, by mesne assignments, to Lanard Corporation, Davenport, Iowa, a corporation of Iowa Application October 25, 1952, Serial No. 316,823

8 Claims. (Cl. 237—12.3)

The present invention concerns a system for controlling the temperature of an automotive truck or truck-trailer cargo, employing as a control medium the engine coolant of the vehicle. The invention is also related to certain improved components of the system, such as an improved control valve unit by which the flow of a cargo heating medium is automatically regulated, and to an improved heat transfer or heat radiant tubing layout in the truck or truck-trailer cargo compartment.

It is a general object of the invention to provide a cargo heat control system of the foregoing character which is notable for the extreme simplicity, economy and compactness of its parts, featuring a dual loop heating conduit in the floor of the cargo compartment acting to insure uniform distribution of radiated heat, together with an improved valve construction for controlling supply-return circulation of liquid heating medium for this conduit from and to the usual engine driven circulating pump, the improved valve also servicing a separate cab heater line as an adjunct to its control function.

More specifically, it is an object of the invention to provide a system of radiant cargo heating tubing economically supplied with heating medium from the engine block of the cargo vehicle, and an improved, consolidated, multiple port valve controlled by an electromagnetically actuated, thermostatically regulated plunger.

A further specific object is to provide an improved multiple port valve unit, preferably electromagnetically controlled, featuring, in a single unitary valve body, three distinct chambers having provisions for connecting the same respectively with the engine block of a vehicle, with the supply end of a cargo heater conduit or coil, and with the return end of the latter, plus a valve port controlled by a plunger valve to control flow between the first two chambers, the first named and last named chambers also having throttled connector fittings adapted to communicate the same with a cab heater of conventional design, and the last named chamber being still further provided with a return connector fitting adapted to communicate the same with an engine pump return; whereby a single consolidated, integrally constructed valve and union device may control circulation of heating medium through engine block and cargo heater and at the same time complete a cab heater flow circuit, thereby assisting in attaining the primary broad object of the present invention, i. e., to provide an efficient cargo heating system of maximum simplicity and minimum cost.

The foregoing statement is indicative in a general way of the nature of the invention. Other and more specific objects will be apparent to those skilled in the art upon a full understanding of the system and its component parts.

A single embodiment of the invention is presented herein for purpose of illustration. It will be appreciated that the invention may be incorporated in other modified forms coming equally within the scope of the appended claims.

In the drawings:

Fig. 1 is a schematic, top plan layout showing in dot-dash lines a conventional cargo truck commonly employed in the overland shipment of produce, fruit and other perishable commodities, and illustrating in solid lines the general arrangement of features of the improved cargo heat control system;

Fig. 2 is another schematic view in side elevation further illustrating the relationship of parts of the system;

Fig. 3 is an enlarged fragmentary view in transverse vertical section along a line corresponding to line 3—3 of Fig. 1, illustrating the manner in which the radiant fin tubing of the cargo heating coil of the system is arranged relative to and retained in place by certain cross members of the truck cargo space;

Fig. 4 is a view in horizontal section along line 4—4 of Fig. 5, illustrating general features of the improved valve construction of the invention; and Fig. 5 is a view in vertical section along the broken line 5—5 of Fig. 4, further illustrating internal details of the valve construction, as well as the electromagnetically controlled plunger valve thereof.

Referring to Figs. 1 and 2 of the drawings, the reference numeral 10 generally designates a cargo receiving compartment, the reference numeral 11 the operator's cab, and the reference numeral 12 the engine compartment of an entirely conventional automotive truck such as is commonly used for the overland shipment or delivery of perishable produce, fruit, and the like. The system of the invention is equally well adapted for association with other types of commercial motor vehicles, for example, a trailer-truck combination.

Engine compartment 12 houses a schematically depicted engine 13, and a suitable coolant liquid is circulated through the housing of a pump 14 and through radiator 15 in usual manner. The circulating connections between pump, radiator and engine block, being entirely conventional, are in the main omitted from the drawings for simplicity; however, a return hose or pipe 16 from the engine block to radiator 15 may be considered to designate this circuit as a whole, it being understood that the lower end of the radiator is suitably connected to the pump. The intake of pump 14 is also communicated by a rubber hose connection 17 with the present cargo heating system, and a discharge housing 18 on the engine block receives a supply hose 19 of the system. Through this hose connection hot coolant liquid is forced to circulate by pump 14, under the control of an electromagnetically actuated valve which is generally designated 20. Details of internal construction and operation of valve 20 will be enlarged on following a general description of the improved system as a whole.

A suitable flexible hose 21 is connected to a cargo heater supply nipple of valve 20, this hose being appropriately insulated by a spiral wrapping of sponge rubber properly taped in place. Hose 21 passes externally beneath operator's cab 11 and is suitably secured in place by clamps 22. It leads to a corner intake, T-type connector 23 of a rectangular cargo heating conduit arrangement, generally designated 24, the connection being made at the corner of the conduit for a purpose to be described. Connector 23 is joined by rubber hose or 45° L's to the remainder of conduit 24, made up of elongated lengths of non-corrosive metal fin tubing 25, suitable straight hose connectors and 90° corner L's or corner hose connectors. Such connecting provisions are more or less conventionally shown in Figs. 1 and 2, for simplicity.

As illustrated in Fig. 3 of the drawings, tubing 25 is provided with a multiplicity of longitudinally spaced, circular disk fins 26 fixedly applied thereto in a conventional manner. The fin tubing is held in place, resting on the flooring 27 of cargo compartment 10, by the spaced transverse cross members 28 which are intended to support cargo floor racks (not shown) on which merchandise is stacked. To this end, members 28 are slotted to accommodate the tubing, the slot edges 29 being inclined divergently downwardly so as to snugly grip fins 26 and maintain the tubing against floor 27.

Successive lengths of tubing 25 are connected by corner L's and suitable flexible hose joints 30, secured in place by spring clamps, so as to define a dual conduit circulatory line; this line comprises U-shaped, outer and inner circulating paths, each supplied by the hose 21 at corner connector 23 and each discharging to a return hose 32 through a similar connector 23 joined in conduit 24 at an outer corner thereof. Corner connecting of the hoses 21, 32 equalizes the total length of the respective outer and inner, U-shaped circulating reaches of conduit 24, thereby equalizing flow friction in the latter.

By reference to Fig. 1, it will be noted that the connecting cross lengths 24' of the U-shaped components of conduit 24 are disposed closely adjacent one another at the rear of the cargo interior. This affords extra radiating tubing at the particularly cold space of the vehicle interior near its rear loading door.

Figs. 4 and 5 show details of the improved valve construction 20 by which the flow of liquid heating medium through system 24 is controlled. It comprises a cast hollow, generally circular valve body 33 provided with six integral outwardly radiating fittings or nipples, which open in a single horizontal plane to the interior of valve body 33.

They include an engine block intake nipple 34 receiving hose 19, in which a suitable strainer 35 is desirably placed to screen out scale and other foreign matter in advance of valve 20. A cab heater discharge nipple 36 is next in clockwise circumferential order, communicating with an upper valve chamber 37 to which supply nipple 34 also opens. A certain proportion of liquid is thus by-passed directly through chamber 37 and nipple 36 to a hose 36' (Fig. 1) leading to a heater (not shown) in operator's cab 11; this heater is a conventional one, under the manual control of the vehicle operator. Liquid flowing through nipple 36 is throttled somewhat, because of the lesser requirements of the cab, by a small tubular adapter 38 threaded in the outer end of the nipple.

Intake chamber 37 is separated by an integral upstanding wall 39 of arcuate shape from a discharge chamber 40 in valve body 33, chamber 40 being in communication with a cargo heater supply nipple 41. Supply hose 21 for system 24 is fitted on nipple 41.

Next in order are a cargo heater return nipple 42 to which return hose 32 is applied, a cab heater return nipple 43 receiving a return hose 43' (Fig. 1), and a pump return nipple 44, to which return hose 17 to pump 14 is fitted. These last three nipples communicate with a third chamber in valve body 33, namely, a common liquid return chamber 45, which is separated from the other two chambers 37, 40 by a shaped upstanding wall 46 integral with the body.

The valve intake chamber 37 is separated from the cargo heater discharge chamber 40 by means of a generally horizontal partition 47 integral with the internal walls of body 33. This partition is vertically bored to provide a valve passage or port 48 adapted when open to communicate chambers 37, 40. Passage 48 is controlled by a vertically acting cylindrical valve plunger 49 having a conical lower nose engageable with a valve seat constituted by the upper extremity of the passage.

The upper wall 50 of valve body 33 is cored out and threaded at 51 to receive a special sealing and valve guiding member 52. This member is of elongated tubular construction, provided with a threaded lower portion, which engages in bore 51, and externally flanged, hexagonal portion 53. Portion 53 clamps a sealing gasket 54 between member 52 and valve body 33. An upward tubular extension 55 of member 52 slidably guides valve plunger 49, and the solid upper terminus 56 of the member serves as an abutment for the upper end of the coil spring 57, which spring engages and urges valve 49 downwardly into sealing engagement with passage or port 48.

An electromagnet coil 58 surrounds a spacer sleeve 59 applied to the extension 55, this sleeve supporting the spool of the coil. Leads of the coil are designated 60, 61, and an inverted cup-shaped housing 62 completes the electromagnet construction.

Valve unit 20 is appropriately supported within the engine compartment as by means of an L-shaped bracket 63, to which valve body 33 is secured at its base.

Coil lead 60 is suitably grounded on the vehicle, while the lead 61 is brought backwardly into the cargo interior 10 and connected to a suitable thermostat 64, preferably mounted in an elevated position on the wall of cargo interior adjacent the rear, cooler zone of the latter. Electrical lead 65 connects thermostat 62 with the vehicle ignition switch 66 in cab interior 11, and electromagnet coil 58 and thermostat 64 are thus connected in circuit with the grounded battery of the vehicle (not shown) in a manner which will be readily understood by those skilled in the art. The cab heater, supplied with heating medium through hoses 36', 43' is, as pointed out above, controlled mechanically within the cab. If an additional control for the cargo heating system is desired, a still further switch 67 may be mounted on the dashboard of the cab, this switch being electrically connected with leads 61, 65 in the fashion illustrated in Fig. 1 of the drawings.

In the operation of the foregoing system, closing of ignition switch 66 (and switch 67 if such switch is included in the circuit) result in the completion of a control circuit for electromagnet coil 58 which is governed by thermostat 64. When the temperature in the truck cargo interior drops below a pre-determined level to which the thermostat is set, coil 58 is energized, lifting plunger valve 49 against the resistance of spring 57 and opening port 48, thus to communicate cargo heater discharge chamber 40 with intake chamber 37. Equalized flow of heating medium ensues through the respective inner and outer U-shaped reaches of the conduit 24, with relatively uniformly distributed radiation to the cargo interior. When the pre-determined desired temperature is reached, thermostat 64 opens the electrical circuit, de-energizing the solenoid coil and permitting spring 57 to re-engage valve 49 with the port 48.

Valve unit 20 incorporates, in a single compact and inexpensive cast body 33, all of the porting, chambering and passaging provisions required to handle fluid flow through two distinct heating systems, one of which is automatically controlled by a valve member associated with the body. The unit is easily and quickly mounted in place, and is unfailingly reliable in operation, requiring no attention following initial installation.

The system as a whole is correspondingly simple in nature, readily installable and reliable in operation. Using the engine coolant as a heating medium for the cargo interior of the vehicle, the cost of cargo heating is obviously at an absolute minimum. The components of the system need no attention following initial installation, other than reasonable maintenance required to keep the fin tubing of conduit 24 free from clogging by accumulation of debris, such as would decrease its heat transfer efficiency.

I claim:

1. A heating system for a truck cargo compartment or the like, comprising a continuous U-shaped conduit in the form of liquid circulating tubing disposed horizontally at the bottom of said compartment, said conduit having supply and return reaches each including a pair of generally parallel tubing legs connected to one another at their ends, each leg being connected to a leg of the other reach by transverse tubing at the base of the reaches, conduit supply and return lines connected, respectively, to the end connections of the respective legs of said reaches, the pair of tubing legs of each of said supply and return reaches constituting a leg of said U-shaped conduit, and a multiport valve controlling flow in said conduit.

2. A heating system for a truck cargo compartment or the like, comprising a continuous U-shaped conduit in the form of liquid circulating tubing disposed horizontally at the bottom of said compartment, said conduit comprising elongated outgoing and return tubing legs connected by transverse tubing at the base of the conduit, conduit supply and return lines connected, respectively, to ends of the respective legs of said conduit, and a multiport valve controlling flow in said conduit, comprising an integral, one piece valve body having a valve controlled outlet chamber provided with a conduit supply opening to which said supply line is connected, a return chamber separate from said outlet chamber to which said conduit return line is connected, and an intake chamber separate from said outlet and return chambers and adapted to be communicated with the former, said intake and return chambers having receiving and discharge openings, respectively, and each having a further opening to which a liquid circulating line distinct from said conduit supply and return lines may be connected.

3. A heating system for a truck cargo compartment or the like, comprising a continuous U-shaped conduit in the form of liquid circulating tubing disposed horizontally in tortuous outline at the bottom of said compartment, said tubing comprising dual inner and outer U-shaped reaches nested one within the other, conduit supply and return lines connected, respectively, to the ends of each of the respective legs of said reaches which are remote from the bases of the U-shapes, the pair of tubing legs of each of said supply and return reaches constituting a leg of said U-shaped conduit, and a multiport valve controlling flow in said conduit.

4. A cargo heating system in accordance with claim 3, in which said nested U-shaped tubing reaches have parallel transverse base portions located at the rear of said cargo compartment and disposed relatively close to one another, compared with the spacing of other corresponding portions of the reaches.

5. A heating system for a truck cargo compartment or the like, comprising a continuous conduit in the form of liquid circulating tubing disposed horizontally in tortuous outline at the bottom of said compartment, said tubing comprising dual inner and outer U-shaped reaches nested one within the other, conduit supply and return lines connected, respectively, to remote outer corners of the respective legs of said reaches, and a multiport valve controlling flow in said conduit comprising an integral, one piece valve body having a valve controlled outlet chamber provided with a conduit supply opening to which said supply line is connected, a return chamber separate from said outlet chamber to which said conduit return line is connected, and an intake chamber separate from said outlet and return chambers and adapted to be communicated with the former, said intake and return chambers having receiving and discharge openings, respectively, and each having a further opening to which a liquid circulating line distinct from said conduit supply and return lines may be connected.

6. A cargo heat control system for truck cargo compartments and the like, comprising a continuous length of liquid circulating tubing disposed horizontally in tortuous outline at the bottom of said compartment, said tubing comprising inner and outer reaches of U-shaped outline nested one within the other, with base portions which connect corresponding legs of said reaches disposed in parallel, closely spaced relation to one another, as compared to corresponding other portions, the ends of the legs of said respective reaches remote from said base portions being connected by further tubing portions and supply and return lines connected, respectively, to said further tubing portions between the same and the legs of said outer reaches.

7. A multiple port valve unit comprising a one piece hollow housing having means providing an intake chamber, a discharge chamber separate from said intake chamber, a passage adapted to communicate said chambers, and a return chamber separate from said intake and said discharge chamber, said intake chamber having separate intake and discharge fittings opening to the exterior of said body, said discharge chamber having a discharge fitting opening to the exterior of said body, and said return chamber having at least three distinct return fittings opening to the exterior of said body, and a valve slidably guided with relation to said body for engagement and disengagement with said passage to control liquid flow from said intake fitting and chamber to said discharge chamber, said intake chamber discharge fitting and the fittings of said return chamber communicating the intake and return chambers with the exterior of said body without regard to said valve.

8. A multiple port valve unit comprising a one piece hollow housing having means providing an intake chamber, a discharge chamber separate from said intake chamber, a passage adapted to communicate said chambers, and a return chamber separate from said intake and said discharge chamber, said intake chamber having separate intake and discharge fittings opening to the exterior of said body, said discharge chamber having a discharge fitting opening to the exterior of said body, and said return chamber having at least three distinct return fittings opening to the exterior of said body, said fittings being disposed in generally coplanar arrangement and extending radially outwardly of said body, and a valve slidably guided with relation to said body for engagement and disengagement with said passage to control liquid flow from said intake fitting and chamber to said discharge chamber, said intake chamber discharge fitting and the fittings of said return chamber communicating the intake and return chambers with the exterior of said body without regard to said valve.

References Cited in the file of this patent

UNITED STATES PATENTS

| | | |
|---|---|---|
| 1,404,901 | Schrieder | Jan. 31, 1922 |
| 1,608,982 | Hatch | Nov. 30, 1926 |
| 1,765,984 | Kocourek | June 24, 1930 |
| 1,787,913 | Loyd | Jan. 6, 1931 |
| 1,898,825 | Fowler | Feb. 21, 1933 |
| 1,925,436 | Dowd | Sept. 5, 1933 |
| 2,181,742 | Rumpf | Nov. 28, 1939 |
| 2,522,285 | Lehane et al. | Sept. 12, 1950 |

FOREIGN PATENTS

| | | |
|---|---|---|
| 727,548 | France | Mar. 24, 1932 |
| 762,725 | France | Jan. 29, 1934 |